(12) United States Patent
Koppula et al.

(10) Patent No.: US 10,805,202 B1
(45) Date of Patent: Oct. 13, 2020

(54) CONTROL PLANE COMPRESSION OF NEXT HOP INFORMATION

(71) Applicant: Juniper Networks, Inc., Sunnyvale, CA (US)

(72) Inventors: Sharmila Koppula, Campbell, CA (US); Sri Karthik Goud Gadela, Cupertino, CA (US); Sreekanth Rupavatharam, Campbell, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 51 days.

(21) Appl. No.: 16/258,310

(22) Filed: Jan. 25, 2019

(51) Int. Cl.
*H04L 12/755* (2013.01)
*H04L 12/741* (2013.01)
*H04L 12/733* (2013.01)
*H04L 12/721* (2013.01)
*H04L 12/747* (2013.01)
*H04L 12/749* (2013.01)

(52) U.S. Cl.
CPC ............ *H04L 45/021* (2013.01); *H04L 45/20* (2013.01); *H04L 45/26* (2013.01); *H04L 45/66* (2013.01); *H04L 45/741* (2013.01); *H04L 45/742* (2013.01); *H04L 45/745* (2013.01)

(58) Field of Classification Search
CPC ....... H04L 45/021; H04L 45/20; H04L 45/26; H04L 45/745; H04L 45/66; H04L 45/741; H04L 45/742; H04L 45/16
See application file for complete search history.

(56) References Cited

U.S. PATENT DOCUMENTS

2015/0312137 A1* 10/2015 Li .................... H04L 45/16
 709/238
2016/0119159 A1 4/2016 Zhao et al.
2016/0191372 A1 6/2016 Zhang et al.

OTHER PUBLICATIONS

Plummer, "An Ethernet Address Resolution Protocol—or—Converting Network Protocol Addresses to 48.bit Ethernet Address for Transmission on Ethernet Hardware," Network Working Group, RFC 826, Nov. 1982, 9 pp.

(Continued)

*Primary Examiner* — Vinncelas Louis
(74) *Attorney, Agent, or Firm* — Shumaker & Sieffert, P.A.

(57) ABSTRACT

A method includes receiving, by processing circuitry of a first network device, an indication of a logical address associated with an interface to a second network device and adding, by the processing circuitry, an entry to a forwarding table of the first network device, the entry in the forwarding table specifying the logical address. The method further includes adding, by the processing circuitry, an entry to a resolver database of the first network device to which the entry in the forwarding table specifying the logical address points and resolving, by the processing circuitry, the logical address to a hardware address of the second network device. In response to determining an existing next hop entry of a next hop database of the first network device corresponds to the hardware address of the second network device, the method includes pointing, by the processing circuitry, the entry in the resolver database to the existing next hop entry in the next hop database without adding an additional entry to the next hop database for the second network device.

20 Claims, 4 Drawing Sheets

(56) References Cited

OTHER PUBLICATIONS

"Internet Protocol," DARPA Internet Program Protocol Specification, Information Sciences Institute University of Southern California, RFC 791, Sep. 1981, 97 pp.
Deering et al., "Internet Protocol, Version 6 (IPv6) Specification," Internet Engineering Task Force (IETF), RFC 8200, Jul. 2017, 43 pp.
Braden, "Requirements for Internet Hosts—Communication Layers," Network Working Group, RFC 1122, Oct. 1989, 117 pp.
Trotter, "Terminology for Forwarding Information Base (FIB) based Router Performance," Network Working Group, RFC 3222, Dec. 2001, 15 pp.
Office Action from U.S. Appl. No. 16/162,323, dated Dec. 11, 2019, 25 pp.

* cited by examiner

CONTROL PLANE COMPRESSION OF NEXT HOP INFORMATION

TECHNICAL FIELD

The disclosure relates to network devices and, particularly, forwarding packets by network devices.

BACKGROUND

A computer network is a collection of interconnected network devices that can exchange data and share resources. Example network devices include network devices, switches, and other layer two (L2) network devices that operate within layer two of the Open Systems Interconnection (OSI) reference model, i.e., the data link layer, and layer three (L3) network devices that operate within layer three of the OSI reference model, i.e., the network layer. Network devices within computer networks often include a control unit that provides control plane functionality for the network device and forwarding unit for routing or switching data units.

Sending Internet Protocol (IP) packets on a multi-access network requires mapping from an IP address to a media access control (MAC) address (the physical or hardware address). In an Ethernet environment, Address Resolution Protocol (ARP) is used to map a MAC address to an IP address. ARP dynamically binds the IP address (the logical address) to the correct MAC address. Before IP unicast packets can be sent, ARP discovers the MAC address used by the Ethernet interface where the IP address is configured. Network devices that use ARP maintain a cache of discovered Internet-to-Ethernet address mappings to minimize the number of ARP broadcast messages. Before sending a packet, a network device searches its cache for an Internet-to-Ethernet address mapping. If the mapping is not found, the host sends an ARP request to obtain the address mapping.

A network device of a computer network may use a next hop database for determining a next hop to which to forward a packet along a route to a destination device. More specifically, the network device may store a next hop for each learned internet protocol (IP) address in a next hop database, which may be used to help to forward packets.

SUMMARY

In general, the disclosure describes techniques related to compressing a next hop database. For example, rather than storing a separate entry in the next hop database for each learned logical address (e.g., IP address), some entries of which may be associated with the same physical network device and thus a same hardware address, a network device may store only one entry per unique hardware address in the next hop database and use a resolver database having separate entries for each learned IP address, which point to an entry in the next hop database. In this way, a size of the next hop database may be compressed to conserve space in the next hop database of the network device, for example, thereby leaving space in the next hop database for additional, unique IP addresses that identify unique physical network devices. This may conserve computing resources of the network device.

In one example, a method includes: receiving, by processing circuitry of a first network device, an indication of a logical address associated with an interface to a second network device; adding, by the processing circuitry, an entry to a forwarding table of the first network device, the entry in the forwarding table specifying the logical address; adding, by the processing circuitry, an entry to a resolver database of the first network device to which the entry in the forwarding table specifying the logical address points; resolving, by the processing circuitry, the logical address to a hardware address of the second network device; and in response to determining an existing next hop entry of a next hop database of the first network device corresponds to the hardware address of the second network device, pointing, by the processing circuitry, the entry in the resolver database to the existing next hop entry in the next hop database without adding an additional entry to the next hop database for the second network device.

In another example, a first network device includes: one or more memories for storing a forwarding table, a resolver database, a next hop database; and processing circuitry connected to the one or more memories and configured to: receive an indication of a logical address associated with an interface to a second network device; add an entry to the forwarding table of the first network device, the entry in the forwarding table specifying the logical address; add an entry to the resolver database of the first network device to which the entry in the forwarding table specifying the logical address points; resolve the logical address to a hardware address of the second network device; and in response to determining an existing next hop entry of the next hop database of the first network device corresponds to the hardware address of the second network device, point the entry in the resolver database to the existing next hop entry in the next hop database without adding an additional entry to the next hop database for the second network device.

In another example, a computer-readable medium comprising instructions for causing a programmable processor of a first network device to: receive an indication of a logical address associated with an interface to a second network device; add an entry to a forwarding table of the first network device, the entry in the forwarding table specifying the logical address; add an entry to a resolver database of the first network device to which the entry in the forwarding table specifying the logical address points; resolve the logical address to a hardware address of the second network device; and in response to determining an existing next hop entry of a next hop database of the first network device corresponds to the hardware address of the second network device, point the entry in the resolver database to the existing next hop entry in the next hop database without adding an additional entry to the next hop database for the second network device.

The details of one or more examples are set forth in the accompanying drawings and the description below. Other features, objects, and advantages will be apparent from the description and drawings, and from the claims.

DETAILED DESCRIPTION

Figure 1:
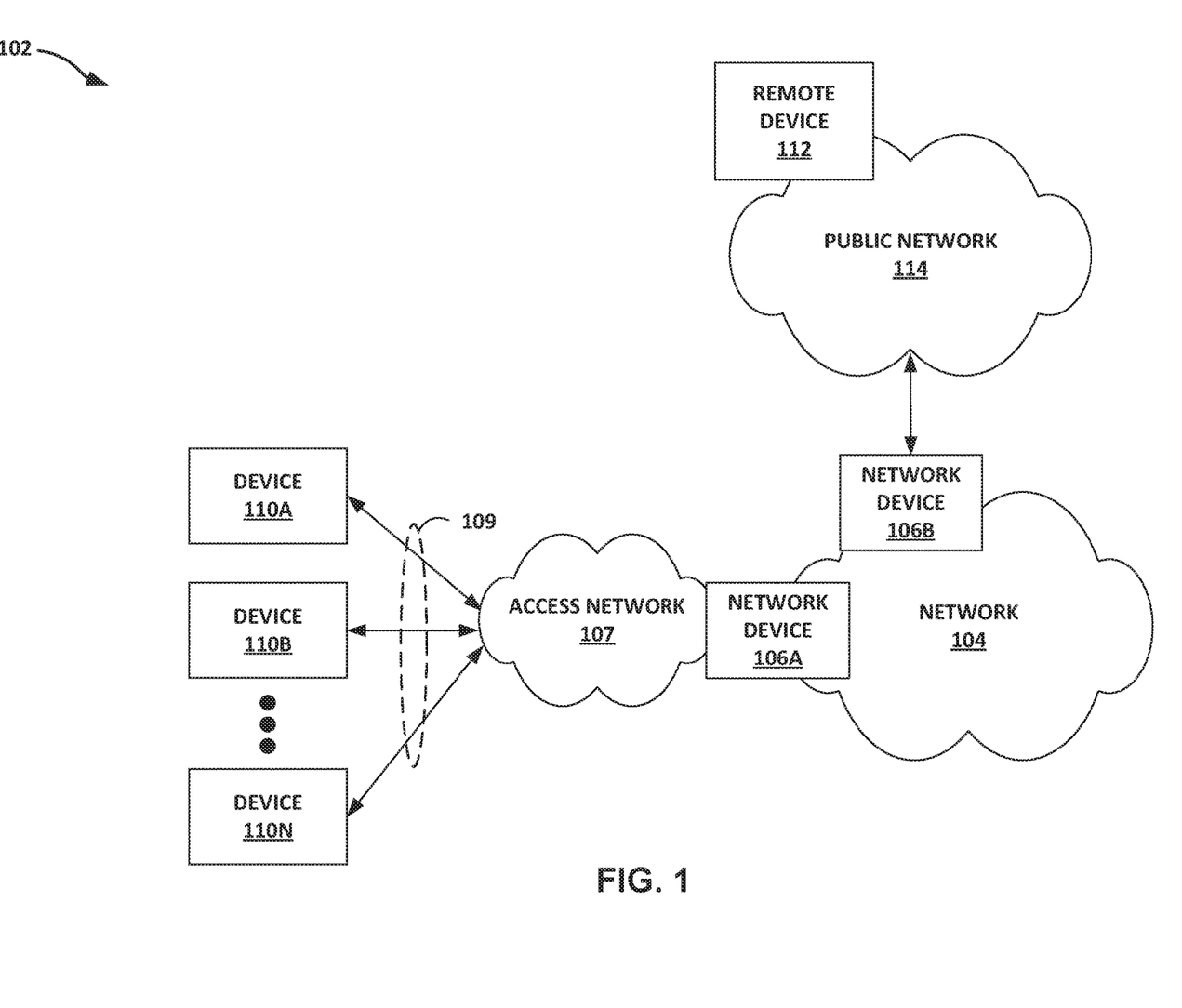
FIG. 1 is a block diagram illustrating an example network in accordance with the techniques of the disclosure.

FIG. 1 is a block diagram illustrating an example network in accordance with the techniques of the disclosure. System 102 includes network 104, network devices 106A-106B (collectively, network devices 106), access network 107, and public network 114. System 102 is for example purposes only. For instance, in some examples, access network 107 and/or public network 114 may be omitted. Devices 110A-110N (collectively, devices 110) connect to network 104 via network devices 106 in order to access resources provided by network 104. Each of devices 110 may be an end-user computing device, such as a personal computer, a laptop computer, a mobile telephone, a network telephone, a television set-top box, a video game system, a point-of-sale device, a personal digital assistant, an intermediate network device, a network appliance, a supercomputer, a mainframe computer, an industrial robot, or another type of device capable of interfacing with and communicating over network 104.

Network 104 may include a plurality of network devices (e.g., routers) that facilitate the access of content by devices 110. Each of the plurality of network devices may comprise one of a network device, a switch, a server, a database server, a hub, a firewall, an intrusion detection/prevention (IDP) device and/or any other type of networking equipment or device that facilitates the transfer of data to and from devices 110. Network 104 includes network devices 106, which communicate using various protocols, such as the Border Gateway Protocol and the Internet Control Message Protocol, in order to exchange routing, network configuration information, and other information. The network may be a local area network ("LAN"), such as a token ring or Ethernet network, a virtual local area network ("VLAN"), or another type of network. The network may comprise one or more wired or wireless links. For example, network 104 may be an Ethernet network that comprises one or more Ethernet cables. In another example, the network may be a Wireless Fidelity ("Wi-Fi") network that uses wireless radio transmissions to communicate information. In another example, network 104 may be a mobile network. Although shown as a single network 104 in FIG. 1, network 104 may comprise any number of interconnected networks, either public or private, in which the various networks interconnect to form one or more virtual networks.

Network 104 provides a variety of resources that may be accessed by devices 110. Network 104 may include a content server that stores or otherwise sources content. Content, as the term is used herein, refers to any data commonly transmitted and/or stored within a network, such as web-based applications, images, documents, web pages, video data, audio data such as voice, web-based games, scripts, or any other type of network-based content. Network 104 may support multicast techniques to improve the delivery efficiency of data transmitted with the network. Typically network 104 will also connect to a variety of other types of devices (e.g., file servers, printers, telephones, and e-mail and other application servers). Network 104 is also shown coupled to public network 114 (e.g., the Internet) via network device 106B. Public network 114 may include, for example, one or more client computing devices. Public network 114 may provide access to web servers, application servers, public databases, media servers, end-user devices, and many other types of network resource devices and content.

Network 104 may transmit content to devices 110 through network device 106A using one or more packet-based protocols, such as an Internet Protocol (IP)/Transmission Control Protocol (TCP). In this respect, network 104 may support the transmission of data via discrete data units, often referred to as "packets," or simply "packets." As a result, network 104 may be referred to as a "packet-based" or "packet switched" network. While described in this disclosure as transmitting, conveying, or otherwise supporting packets, network 104 may transmit data according to any other discrete data unit defined by any other protocol, such as a cell defined by the Asynchronous Transfer Mode (ATM) protocol, or a datagram defined by the User Datagram Protocol (UDP).

Devices 110 may be subscriber devices that attach to network 104 via access network 107 to obtain services offered by network 104 to subscribers. As subscriber devices, devices 110 may each comprise, for example, a mobile phone, a smart phone, a desktop/laptop computer, a gaming console, a video-conferencing suite, a workstation, a wireless device, a network-ready appliance, a file server, print server, a digital subscriber line (DSL) router, a cable modem, or another device with which to access services of network 104. A subscriber may represent, for instance, an enterprise, a residential subscriber, or a mobile subscriber. Devices 110 connect to access network 107 via access links 109 that may each comprise wired and/or wireless communication links. The term "communication link," as used herein, comprises any form of transport medium, wired or wireless, and can include intermediate nodes such as network devices. Each of access links 109 may include, for instance, aspects of an asymmetric DSL network, WiMAX, a T-1 line, an Integrated Service Digital Network (ISDN), or wired Ethernet.

Access network 107 aggregates data traffic from one or more subscribers for transport to/from network 104. Access network 107 includes network nodes (not shown in FIG. 1) that execute communication protocols to transport control and user data to facilitate communication between devices 110 and network 104. Access network 107 may comprise, for example, digital subscriber line access multiplexers (DSLAMs), switches, edge routers, broadband remote access servers (BRAS), a gateway general packet radio service (GPRS) support node (GGSN) and other GPRS support node (GSNs), a Universal Mobile Telephone System (UMTS) having a UMTS Terrestrial Radio Access Network (UTRAN), and/or a 3GPP Long Term Evolution (LTE) mobile access network employing, for instance, service gateways (SGWs), packet data network gateways (PDNs), and eNodeBs, a mobile IP network, an IP network, or another type of network that provides access for subscribers to network 104. The elements of access network 107 may support a variety of protocols, such as Internet Protocol (IP), Frame Relay, Asynchronous Transfer Mode (ATM), Ethernet, Point-to-Point Protocol (PPP), Point-to-Point Protocol over Ethernet (PPPoE), GPRS tunneling protocol (GTP), and virtual local area network (VLAN)-related protocols, among others. Devices 110 may each have a dedicated subscriber interface, e.g., an ATM virtual circuit (VC) or an Ethernet virtual local area network (VLAN), to access network 107.

Network 104 may represent a public network that is owned and operated by a service provider to interconnect a plurality of networks, such as access network 107. Network 104 may implement Multi-Protocol Label Switching (MPLS) forwarding and in such instances may be referred to as an MPLS network. In some instances, network 104 represents a plurality of interconnected autonomous systems, such as the Internet, that offers services from one or more service providers.

Transport links may couple network device 106A to access network 107 and network 104. For example, network device 106A may be considered as located "behind" access network 107. For instance, all network traffic exchanged between access network 107 and network 104 may traverse network device 106A. Network device 106A may constitute a part of a backhaul network, which may include land-based transmission lines, leased by a service provider, to transport data and control traffic between access network 107 and network 104.

The backhaul network may include switches, aggregation devices, and routers. Network device 106A may comprise a network edge or core router that routes packets to/from access network 107, or network device 106A may comprise an intermediate network device that transports packets between access network 107 and network 104.

Network device 106A may represent an access gateway, a layer three (L3) network edge device that manages subscriber attachment sessions and routes subscriber data traffic to/from network 104. In such instances, network device 106A authenticates or receives authentication for devices 110, authorizes devices 110 to access network 107, and may provide network configuration information to the devices. When one of devices 110 attempts to attach to network 104, network device 106A may authenticate the one device by interfacing to a server using a AAA protocol, such as Remote Authentication Dial-In User Service (RADIUS) or the diameter protocol, to authenticate the subscriber device or a user thereof. Network device 106A in such instances may comprise, for example, a GGSN, an edge router such as broadband network gateway (BNG), BRAS, a cable modem termination system (CMTS), or another network device.

Network device 106A may comprise a switching device that forwards layer two (L2) traffic based on, for example, a media access control (MAC) layer addresses. L2 traffic may include Ethernet frames addressable by MAC layer addresses that may be used, in accordance with the techniques described herein, to identify a subscriber or subscriber class.

Network 104 may include a service provider (SP) network. A network service provider that the service provider network may offer services on a per-subscriber basis to devices 110 that access the service provider network. Services offered may include, for example, traditional Internet access, Voice-over-Internet Protocol (VoIP), video and multimedia services, and security services. The network service provider may configure the SP network to offer services to subscribers in accordance with one or more service level agreements (SLAs) that define network performance levels in a number of dimensions, including the type of offered services and corresponding service parameters (e.g., upstream/downstream bandwidth, reliability (e.g., up-time), security, quality of service, rate limits, and others). In this way, SLAs or other service agreements may govern communication between the SP network and subscriber devices 110.

Any one of devices 110 may begin exchanging data packets with network 104, and such packets traverse network device 106A as members of at least one packet flow. The term "packet flow" refers to a set of packets originating from a particular source device and sent to a particular destination device as part of an application communication session between the source and destination device. A flow of packets, in either the upstream (sourced by devices 110) or downstream (destined for devices 110) direction, may be identified by the five-tuple: <source network address, destination network address, source port, destination port, protocol>. This five-tuple generally identifies a packet flow to which a received packet corresponds and, depending on the flow direction, a subscriber may be associated with either the source network address or the destination network address of the flow. In some instances, access network 107 may overload the five-tuple or a subset thereof with packet flows for multiple different subscribers and/or with multiple packet flows for the same subscriber. For example, device 110A may establish multiple traffic bearers to network device 106A each having distinct QoS parameters that correspond with the service being born, e.g., VoIP or bulk data transfer. Packet flows may therefore also be characterized and identified according to other characteristics, including VLAN tags, PPPoE session, and GTP tunnel identifiers of network layer or data link layer protocol headers/tags that encapsulate the packets. Network device 106A may identify an application using deep packet inspection (DPI).

Network devices 106 may forward packets to an IP address for each packet. The IP address may be an IPv4 address or an IPv6 address, for example. For example, network device 106A may receive a packet from device 110A indicating an IP address for remote device 112. In this example, network device 106A may resolve the IP address into a hardware address for a next hop. For instance, network device 106 may resolve the IP address into a MAC address for network device 106B. Network device 106A may use this resolving of the IP address into the MAC address to forward the packet on an interface to remote device 112.

Network devices 106 may be configured to resolve an IP address into a hardware address using a protocol. For example, network devices 106 may be configured to resolve an IP address to a hardware address using an address resolution protocol (ARP), an example of which may be described at Plummer, D., "An Ethernet Address Resolution Protocol: Or Converting Network Protocol Addresses to 48.bit Ethernet Address for Transmission on Ethernet Hardware", STD 37, RFC 826, DOI 10.17487/RFC0826, November 1982, <https://www.rfc-editor.org/info/rfc826>.

For example, network device 106A receives an indication of a particular logical address associated with an interface to device 110A. For example, network device 106A may receive a configuration including the particular logical address, for example, when network device 110A connects to network 104. If a hardware address for the particular IP address is not already known to network device 106A, network device 106A may generate an ARP request to learn a hardware address for the particular IP address. Upon receiving an ARP reply indicating a hardware address for the particular IP address, network device 106A installs a route for the particular IP address. For instance, network device 106A may insert an entry for the particular address IP address in ARP cache 247. In this example, the entry for the particular address may be copied to forwarding information to be used for forwarding packets for the particular address. In the above example, the IP address may be compliant with internet protocol version 4 (IPv4), which may be found at Postel, J., "Internet Protocol", STD 5, RFC 791, DOI 10.17487/RFC0791, September 1981, <https://www.rfc-editor.org/info/rfc791>. However, in other examples, other IP address versions and/or resolution protocols may be used.

For example, the IP address may be compliant with internet protocol version 6 (IPv6), which may be found at Deering, S. and R. Hinden, "Internet Protocol, Version 6 (IPv6) Specification", STD 86, RFC 8200, DOI 10.17487/RFC8200, July 2017, <https://www.rfc-editor.org/info/rfc8200>. In some examples, network devices 106 may be configured to resolve an IP address to a hardware address using the neighbor discover protocol, an example of which may be described at Braden, R., Ed., "Requirements for Internet Hosts—Communication Layers", STD 3, RFC 1122, DOI 10.17487/RFC1122, October 1989, <https://www.rfc-editor.org/info/rfc1122>.

Network devices 106 may generate a next hop database to associate a hardware address as a next hop corresponding to an IP address. For example, after resolving a hardware address for a particular IP address for a packet sent from device 110A to remote device 112, network device 106A may generate an entry in a next hop database for the hardware address, which is mapped by resolver database 243 to the particular IP address stored in forwarding table 241. In this way, network devices 106 may forward each packet to a next hop using an IP address for the packet and the next hop database without performing address resolution to resolve a next hop for each packet.

In a system in which network devices generate a distinct corresponding entry in a next hop database for each learned IP address, a number of entries in the next hop database increases as a number of learned IP address increases. As such, such a next hop database may consume a relatively large amount of memory at network devices in the control plane, and a relatively large amount of hardware space at network devices in the forwarding plane.

More specifically, for example, in some systems, the same next hop is represented in network devices as a different next hop construct for each address family (IPv4/IPv6) and even for each different address (belonging to the same family) on the directly connected interface of the network device. For example, consider a situation in which a router 2 (R2) has three separate IP addresses associated with router 2 and these are learned by another router 1 (R1), as shown below:

|   |   |
|---|---|
|   | 3.3.3.3/24 |
| R1 ------------------------ (mac m1) R2 |
|   | 2.2.2.2/24 |
|   | 2001::1/64 |

In the absence of the techniques of this disclosure, router 1 (R1) represents router 2 (R2) as three next hops, one for each IP address of 3.3.3.3, 2.2.2.2, and 2001::1, though the action taken in forwarding plane while sending packets out of all these two next hops is exactly the same. For example, this results in:
3.3.3.3→NH1 (L2 rewrite containing mac m1, goes through an ARP state machine and sits in ARP protocol queues)
2.2.2.2→NH2 (L2 rewrite containing mac m1, goes through the ARP state machine and sits in ARP protocol queues)
2001::1→NH3 (L2 rewrite containing mac m1, goes through an ND state machine and sits in ND protocol queues).

Next hops may be a limited resource on many platforms (with different limits on different platforms) and accordingly, such platforms may exhaust the next hop index space such that no further route-next hops can be installed in the system. In some examples, this is strictly a hardware/platform limitation. The techniques of this disclosure can reduce a number of unnecessary next hops in the system and hence make space for "real" next hops. Such a process may help to enhance the capability to learn and install more route-next hops on the network device.

Techniques described herein may compress the next hop to contain only the actual forwarding information and detach the address-family specific link-layer-address-resolution functionality (ARP for IPV4, ND for IPv6) from the next hop construct. This allows for detaching the next hop database from L3 functionality processes running in the control plane. In this way, the next hop can be light-weight and contain only that information needed for forwarding packets in the forwarding plane. All the link-layer-address-resolution functionality and other functionalities (that may be there depending on the address family) can be pushed out of the next hop to a different construct such as, a "resolver-object" or an entry in a resolver database. The link-layer-address-resolution related states, timers etc. can now operate based on resolver-objects. Routes can point to resolver-object which point to the actual forwarding next hops. The above example in the model described herein may have routes-next hops as below.
3.3.3.3-----------resolver-object1-------------|
2.2.2.2-----------resolver-object2-------------|--------------
NH1(L2rewrite containing mac m1
2001::1-----------resolver-object3-------------|
resolver-object1 goes through ARP state machine and sits in ARP protocol queues.
resolver-object2 goes through ARP state machine and sits in ARP protocol queues.
resolver-object3 goes through ND state machine and sits in ND protocol queues.

In this example, all IPv4 and IPv6 addresses on the R2R1 interface of R2 can be represented as a single next hop in R1. If ARP determines the IP address 2.2.2.2 is unreachable, resolver-object2 will turn DOWN, which means the route is no longer forwardable. The Next hop may not undergo any state transition. This optimization can be very beneficial in scenarios like on a BNG where huge number of subscribers (e.g., 512 k subscribers per chassis) each get assigned both IPv4 and IPv6 address possibly in a dual-stack scenario resulting in each having a corresponding ARP entry and a ND entry.

In accordance with the techniques of this disclosure, network devices 106 may be configured to use a resolver database in the control plane, separate from the next hop database, to compress (e.g., decrease a size of) the next hop database in the control plane, and thereby decrease the size of the next hop database in the forwarding plane.

For example, when a first IP address and a second IP address resolve into a same hardware address, network devices 106 may only generate a single entry for the hardware address in a next hop database, and use the resolver database to specify that the first IP address corresponds to the single entry for the hardware address and the second IP address corresponds to the single entry for the hardware address. For instance, the first IP address may be an IPv4 address for network device 106B and the second IP address may be an IPv6 address for network device 106B. In this way, network devices 106 may be configured to store fewer entries in the next hop database. This may improve operation of the network devices by providing a more scalable approach for storing next hop information that better conserves the network devices' computing resources, such as forwarding plane memory. This may increase the scalability of the network device in both the number of connected network devices (e.g., subscribers) the network device may support, where the subscribers each have multiple logical addresses, by reducing the amount of next hop database resources required to support each subscriber. The approach is more scalable because network device configured to use a resolver database as described herein can be used in increasingly large networks having many IP addresses per physical device, without a correspondingly increased burden upon forwarding plane memory resources.

For example, instead of creating n next hops corresponding to n L3 identities (addresses) for the same device learned on the same interface, the network device 106 is configured to create only one next hop corresponding to all n L2 identities for the same device learned on the same interface.

As 'n' grows and as the same scenario happens on multiple interfaces, there may be a significant saving in both next hop index space (a critical resource in the forwarding plane) as well as memory.

As one example, in a 512 k dual stack (v4/v6) subscriber scenario (512 k is the max per chassis subscriber limit), in the absence of the techniques of this disclosure, the router creates 2*512 k=1M next hops, whereas systems using a resolver database in accordance with the techniques of this disclosure may create only 512 k next hops.

Figure 2:
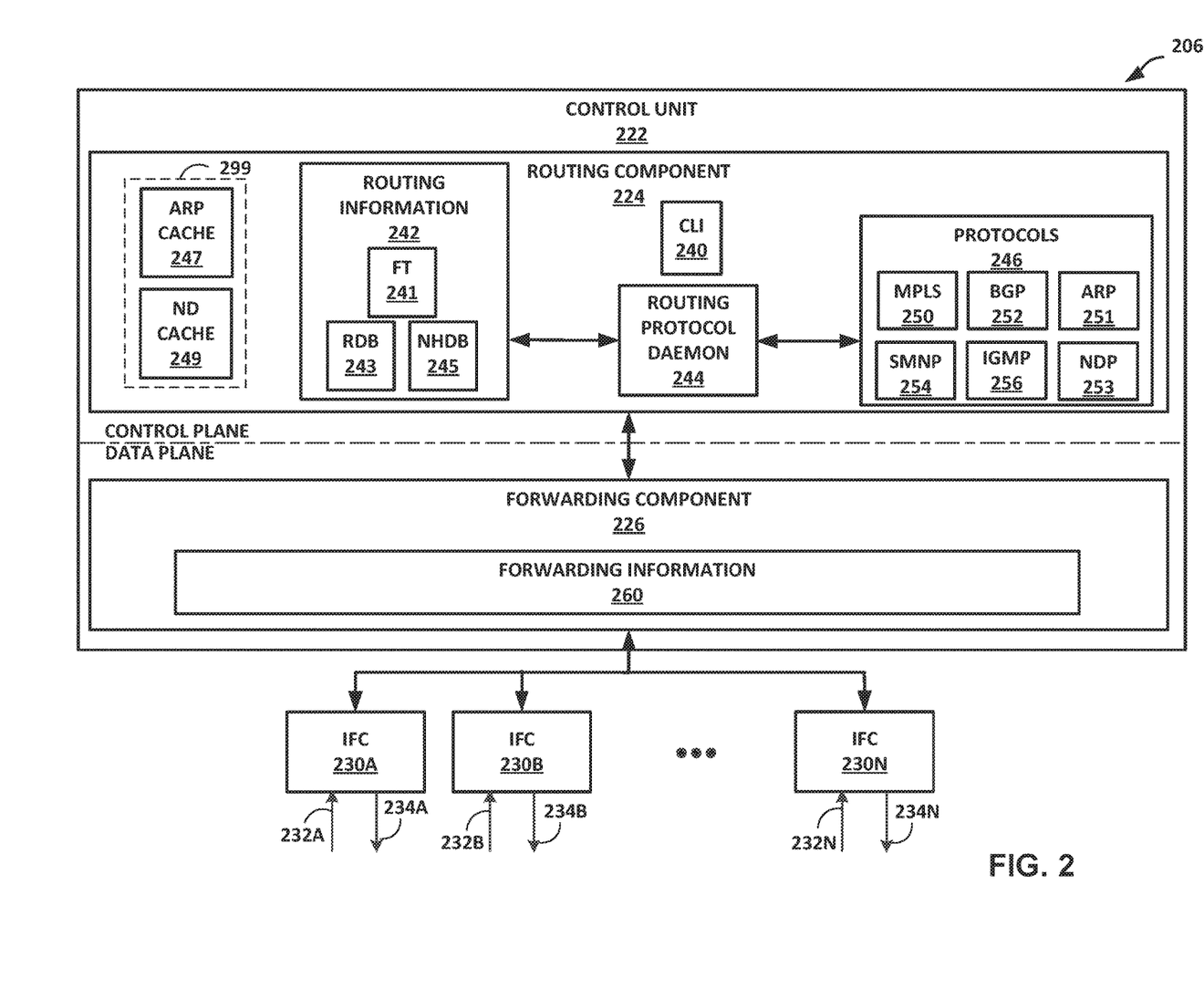
FIG. 2 is a block diagram illustrating an example network device within the network of FIG. 1 in accordance with the techniques of the disclosure.

FIG. 2 is a block diagram illustrating an example network device 206 within network 104 of FIG. 1 in accordance with the techniques of the disclosure. Network device 206 may be, for example, a router or other network device having routing functionality. For example, network device 206 may operate substantially similar to network devices 106 of FIG. 1. In this example, network device 206 includes interface cards 230A-230N ("IFCs 230") that receive packets via incoming links 232A-232N ("incoming links 232") and send packets via outbound links 234A-234N ("outbound links 234"). IFCs 230 are typically coupled to links 232, 234 via a number of interface ports. Network device 206 also includes a control unit 222 that determines routes of received packets and forwards the packets accordingly via IFCs 230.

Control unit 222 includes a routing component 224 and a forwarding component 226. Routing component 224 operates as the control plane for network device 206 and includes an operating system (not shown) that provides a multi-tasking operating environment for execution of concurrent processes. Routing component 224, for example, executes software instructions to implement one or more control plane networking protocols 246. For example, protocols 246 may include, for example, but not limited to, ARP 251, for resolving IP addresses compliant with IPv4 and/or Neighbor Discovery Protocol (NDP) 253 for resolving IP addresses compliant with IPv6. As shown, protocols 246 may include BGP 252, for exchanging routing information with other routing devices and for updating routing information 242. Protocols 246 may further include transport protocols, such as Multiprotocol Label Switching (MPLS) protocol 250, and multicast management protocols, such as Internet Group Management Protocol (IGMP) 256. In other examples, protocols 246 may include other routing, transport, management, or communication protocols.

In some examples, routing component 224 (e.g., a routing engine) includes command line interface (CLI) 240 to permit an administrator to configure and/or manage network device 206. For example, routing component 224 includes a graphical user interface (GUI) instead of a CLI. In a still further example, routing engine executes Simple Network Management Protocol (SMNP) 254 to permit the administrator to configure and/or control network device 206 from a remote terminal.

Routing protocol daemon (RPD) 244 may execute BGP 252 or other routing protocols to update routing information 242. Routing information 242 describes a topology of the computer network in which network device 206 resides, and includes routes through the computer network. Routing information 242 describes various routes within the computer network, and the appropriate next hops for each route, e.g., the neighboring routing devices along each of the routes. Routing information 242 may include, but is not limited to, forwarding table 241, resolver database 243, and next hop database 245. Address resolution cache 299 may include ARP cache 247 and ND cache 249. Forwarding table 241 may store a list of learned IP addresses. Next hop database 245 may store a list of next hops that specify an action to forward to a next hop having a corresponding hardware addresses, for example, MAC addresses. Resolver database 243 may store pointers indicate an entry in the next hop database 245 for each IP address entry in the forwarding table 241.

RPD 244 analyzes information stored in routing information 242 and generates forwarding information for forwarding component 226, which stores the forwarding information in forwarding information 260. For example, routing component 224 may maintain routing information 242 to include a number of route entries within one or more data sources, and one or more radix trees having route resolution nodes. Routing component 224 may maintain resolution nodes for routes having forwarding next hops (FNHs), and for routes having indirect next hops (INHs). The resolution nodes may be threaded together using pointers or linked lists to represent the FNH dependencies between routes. Routing component 224 performs route resolution by traversing the radix tree according to the protocol next hop (PNH) associated with the route.

In response to topology changes, routing component 224 analyzes the dependencies within the routing information to determine FNHs for the affected routes. Based on the determination, routing component 224 issues one or more messages directing forwarding component 226 to update forwarding information 260. For example, routing component 224 may issue a single message directing forwarding component 226 to update a (key, value) pair, i.e., to associate a PNH and any additional protocol-level routing information with a different FNH. In this manner, routing component 224 may issue one or more messages to update forwarding information 260 in response to a network event that affects thousands of routes having the same PNH. Upon issuing the messages, routing component 224 proceeds to perform route resolution and regenerate routing information 242 as necessary based on the dependencies between the routes. Accordingly, processing requirements of the centralized routing component 224 can be limited to the affected routes.

In some examples, routing component 224 copies portions from routing information 242 to forwarding information 260. Routing component 224 may maintain routing information 242 to include a list of all the possible paths a packet can take and maintain forwarding information 260 to include only the best routes to a particular destination. Routing component 224 may determine the best path according to a particular routing protocol being used (e.g., according to protocols 246), but generally the number of hops between a source and a destination may determine the best possible route.

Forwarding component 226 operates as the data plane (also referred to herein as the forwarding plane) for network device 206 and includes forwarding information 260. Forwarding component 226, for example, processes packets forwarded and received by network device 206 via IFCs 230. For example, forwarding component 226 may apply filters and routing policies to outgoing packets and forward the packets to a next hop in the network. In some examples, control unit 222 may include a plurality of packet forwarding engines, each of which are configured to operate similar to forwarding component 226 to provide packet forwarding functions for different flows of network traffic.

Forwarding information 260 may associate, for example, network destinations for network traffic with specific next hops and corresponding IFCs 230 and physical output ports for output links 234. Forwarding information 260 may be a radix tree programmed into dedicated forwarding chips, a series of tables, a complex database, a link list, a radix tree, a database, a flat file, or various other data structures. For example, forwarding information 260 may include all or a subset of the information contained in forwarding table 241, and may include all or a subset of the information contained in next hop database 245. Forwarding information 260 would not include a copy of resolver database 243. In some examples, forwarding information 260 includes lookup structures. Lookup structures may, given a key, such as an address, provide one or more values. In some examples, the one or more values may be one or more next hops. A next hop may be implemented as microcode, which when executed, performs one or more operations. One or more next hops may be "chained," such that a set of chained next hops perform a set of operations for respective different next hops when executed. Examples of such operations may include applying one or more services to a packet, dropping a packet, and/or forwarding a packet using an interface and/or interface identified by the one or more next hops.

Forwarding component 226 may include ASIC-based packet processors ("ASICs"), not shown, that forward packets in accordance with the compressed next hop database as installed in forwarding information 260, according to the techniques described herein. For example, ASICs may include one or more programmable application-specific integrated circuits having a key engine that executes microcode (or "microinstructions") to control and apply fixed hardware components of ASICs to process packet "keys." A packet key includes packet fields and other parameters that determine a flow of packet processing for the packet along an internal processing path. A key engine of forwarding component 226 may include a key buffer to store packet field data for corresponding packets that the key engine is currently processing. The key buffer may also provide limited writable memory to which elements of the internal processing path may write to pass messages accessible by future elements. Some instances of ASICs may include a plurality of key engines each having an associated key buffer and record buffer.

An internal processing path of the ASICs comprises programmable, executable microcode and fixed hardware components that determine the packet processing actions and other operations performed by the key engine. Forwarding component 226 may store executable instructions of the processing path in computer-readable storage media, such as static random access memory (SRAM). Executable instructions of the processing path may be stored in memory external to ASICs onboard forwarding component 226. Forwarding component 226 may also store additional illustrated data structures in computer-readable storage media, such as internal or external SRAM.

In response to a new IP address being received (e.g., configured) for an interface, routing component 224 may add an entry for the IP address in forwarding table 241 and generate a corresponding entry (e.g., resolver object) in resolver database 243. Upon receiving a reply (e.g., ARP reply, NDP reply, etc.) indicating a hardware address for the IP address, routing component 224 installs a route for the IP address. In response to determining the hardware address does not correspond to an existing entry in next hop database 245, routing component 224 may insert a new entry for the IP address in next hop database 245 and use the corresponding entry in resolver database 243 to point to the new entry in next hop database 245.

In response, however, to determining the hardware address corresponds to an existing entry in next hop database 245, routing component 224 may refrain from generating a new entry in next hop database 245 and instead use the corresponding entry in resolver database 243 to point to the existing entry in next hop database 245. In this example, routing component 224 may update an entry for the particular address to forwarding information 260 to be used for to forward packets for the particular address.

In accordance with techniques described herein, in some examples a size of forwarding information 260 may be reduced. For example, routing component 224 may be configured to use resolver database 243, separate from the next hop database, to compress the next hop database. For example, when a first IP address and a second IP address resolve into a same hardware address, routing component 224 may only generate a single entry for the hardware address in a next hop database, and use the resolver database to specify that the first IP address corresponds to the single entry for the hardware address and the second IP address corresponds to the single entry for the hardware address. For instance, the first IP address may be an IPv4 address for a network device and the second IP address may be an IPv6 address for the same network device. In this way, routing component 224 may be configured to store entries in next hop database 245 only for unique hardware addresses, thereby conserving next hop index space. This may result in fewer entries in next hop database 245.

Moreover, as routing component 224 may copy portions from routing information 242 to forwarding information 260, fewer entries in next hop database 245 may result in fewer entries in forwarding information 260, which may improve operation of forwarding component 226 by providing a more scalable approach for storing next hop information that better conserves computing resources, such as next hop index space and forwarding plane hardware used to store forwarding information 260. More specifically, for example, forwarding component 226 may run out of next hops index space in forwarding information 260 based on the hardware limitations of forwarding component 226. However, configuring routing component 224 to use resolver database 243 may help to conserve space in forwarding information 260 by preventing a storing of multiple next hop entries for layer three (L3) addresses that map to the same layer two (L2) address. In this way, network device 206 can learn more "real," distinct next hops and avoid duplicate next hops. The approach is more scalable because the approach can be used in increasingly large networks having many IP addresses per physical device, without a correspondingly increased burden upon forwarding plane memory resources.

Figure 3:
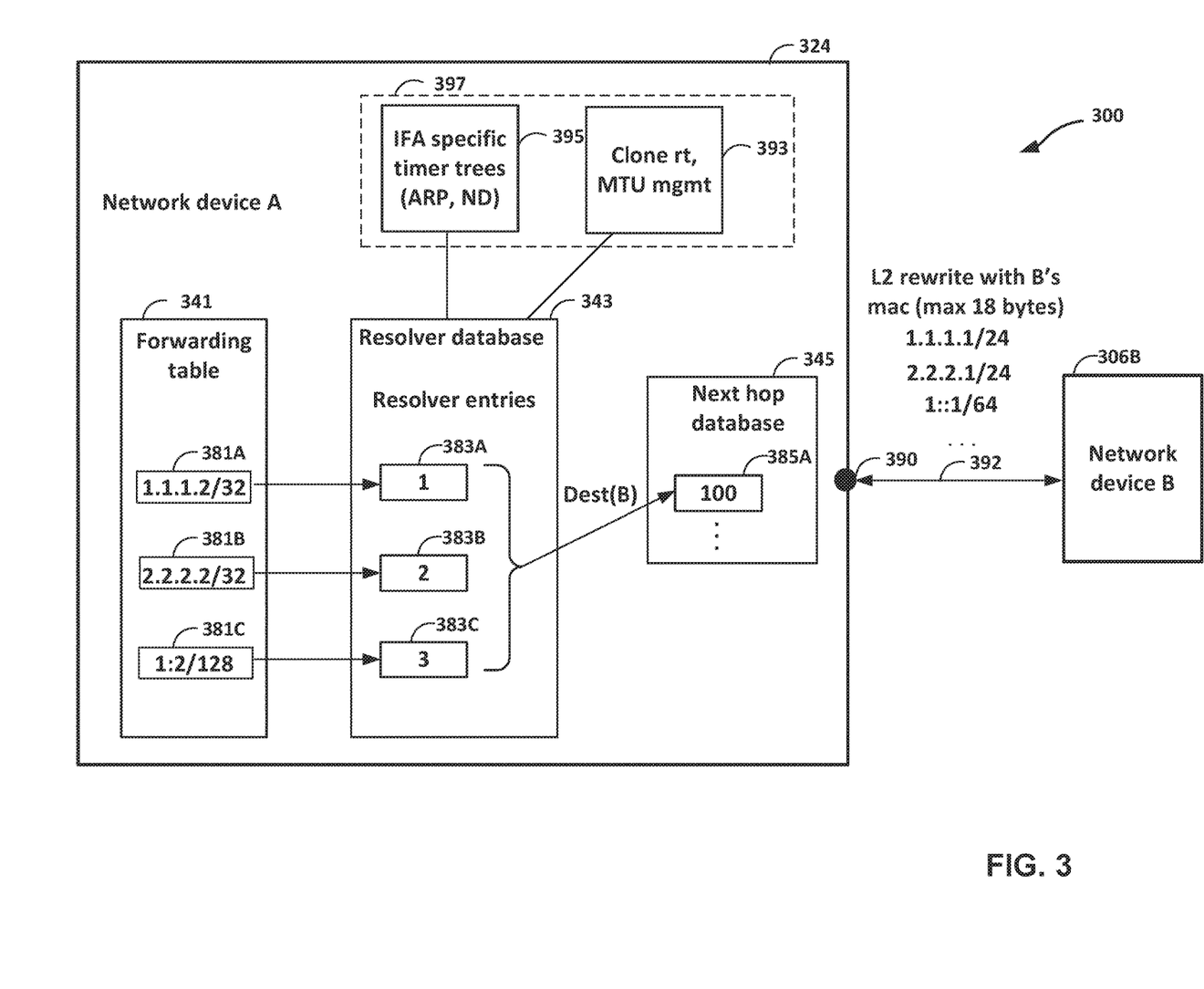
FIG. 3 is a block diagram illustrating an example resolver database in accordance with the techniques of the disclosure.

FIG. 3 is a block diagram illustrating a network device having an example resolver database 343 in accordance with the techniques of the disclosure. As shown, interface 390 may output packets, via link 392, to network device 306B.

Forwarding table 341, resolver database 343, and next hop database 345 may be examples of forwarding table 241, resolver database 243, and next hop database 245 of FIG. 2. Routing engine 324 may be an example of routing component 224 of FIG. 2.

In the example of FIG. 3, routing engine 324 resolves IP addresses 1.1.1.2/32, 2.2.2.2/32, and 1:2/128 as corresponding to hardware address "100." Routing engine 324 generates entry 381A in the forwarding table 341 to specify IP address 1.1.1.2/32, entry 381B to specify IP address 2.2.2.2/32, and entry 381C to specify IP address 1:2/128. Rather than generating a separate entry in next hop database 345 for each of entries 381A-381C, routing engine 324 is configured to generate only entry 385A associated with all of the IP addresses corresponding to entries 381A-381C. In this example, routing engine 324 generates a separate entry for each of entries 381A-381C in resolver databases 343. For instance, routing engine 324 generates entry 383A in resolver database 343 for entry 381A, entry 383B in resolver database 343 for entry 381B, and entry 383C in resolver databases 343 for entry 381C. In this example, each of entries 383A-383C includes a respective pointer to entry 385A, having a hardware address value of 100, for destination of network device 306B ("Dest(B)").

Routing engine 324 may include one or more address-family-specific control plane functions 397. One or more L3 functions, including address-family-specific control plane functions such as IFA specific timer trees (ARP, ND) 397 and clone route, maximum transmission unit (MTU) management 393. One or more address-family-specific control plane functions 397 may represent "family-specific functionality" that are done in the control plane (e.g., by routing component 224) based on the family-specific information in resolver database 343, and may be no longer done based on information in next hop database 345. This allows for detaching the next hop database 345 from L3 functionality processes running in the control plane. As used herein, "family specific" may refer to the address family (e.g., ipv4, ipv6).

In this way, in response to a L2 rewrite with network device 306B, only entry 385A is updated rather than updating three separate entries in next hop database 345. As such, routing engine 324 may update fewer hardware addresses in next hop database 345 compared to routing engines that omit a resolver database, which may reduce a power consumption of routing engine 324 and/or improve a processing speed of routing engine 324. As previously noted, forwarding information is based on next hop database 345, which may result in compressed forwarding information that has fewer entries compared to systems that omit a resolver database. As such, a packet forwarding engine may update fewer hardware addresses in forwarding information compared to systems that omit a resolver database, which may reduce a power consumption of the packet forwarding engine and/or improve a processing speed of the packet forwarding engine.

This may improve operation of network device 306B by providing a more scalable approach for storing next hop information that better conserves network device 306B computing resources, such as forwarding plane memory. The approach is more scalable because the approach can be used in increasingly large networks having many IP addresses per physical device, without the next hop database requiring a correspondingly increased burden upon forwarding plane memory resources.

Figure 4:
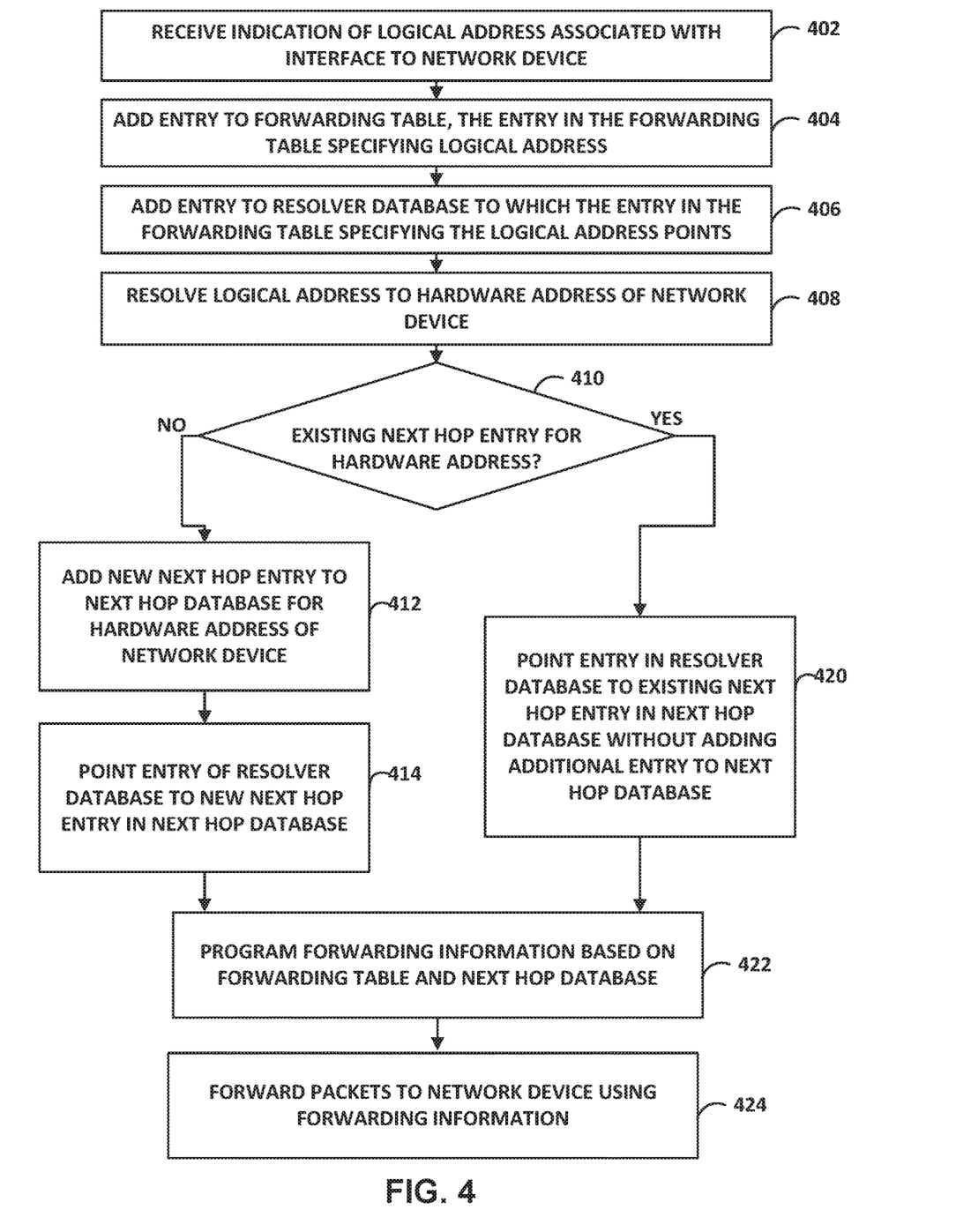
FIG. 4 is a flowchart illustrating an example operation in accordance with the techniques of the disclosure.

FIG. 4 is a flowchart illustrating an example operation in accordance with the techniques of the disclosure. FIG. 4 is described with reference to FIGS. 1-3 for example purposes only.

Routing component 224 receives an indication of a logical address associated with an interface to a network device (402). In some examples, the network device is a subscriber device. The logical address may be, for example, an IPv4 of IPv6 address. Routing component 224 adds an entry to forwarding table 241, the entry in forwarding table 241 specifying the logical address (404). Routing component 224 adds an entry to resolver database 243 to which the entry in forwarding table 241 specifying the logical address points (406). Routing component 224 resolves the logical address to a hardware address of the network device (408). For example, routing component 244 may check ARP cache 247 or ND cache 249 for the logical address, and if a hardware address mapping for the logical address is not already stored in the cache, may invoke ARP 241 or NDP 253 to send messages in accordance with ARP or NDP to obtain a mapping of the logical address to a hardware address and update the cache accordingly.

Routing component 224 determines whether an existing next hop entry of next hop database 245 corresponds to the hardware address of the network device to which the logical address maps (410). In response to determining an existing next hop entry of next hop database 245 corresponds (e.g., matches) to the hardware address of the network device ("YES" step of 410), routing component 224 points the entry in resolver database 243 to the existing next hop entry in next hop database 245 without adding an additional entry to next hop database 245 for the network device (420).

In some examples, the existing next hop entry is already associated with a logical address that is in a different address family than the received logical address. For example, routing component 224 may add an entry to forwarding table 241 specifying an IP address for the existing next hop entry and add an entry to forwarding table 241 specifying the received IP address. In some examples, to resolve the IP address for the existing next hop entry to the hardware address, routing component 224 is configured to resolve the IP address for the existing next hop entry using an ARP and, to resolve the received IP address to the hardware address, routing component 224 is configured to resolve the received IP address using a NDP. In some examples, to resolve the IP address for the existing next hop entry to the hardware address, routing component 224 is configured to resolve the IP address for the existing next hop entry using an NDP and, to resolve the received IP address to the hardware address, routing component 224 is configured to resolve the received IP address using a ARP.

In response to determining that next hop database 245 does not include an entry corresponding to the hardware address of the network device ("NO" step of 410), routing component 224 adds a new next hop entry in next hop database 245 for the hardware address of the network device (412) and, subsequent to adding the new next hop entry, points the entry in the resolver database to the new next hop entry in the next hop database (414). In some examples, to add the new next hop entry in the next hop database for the hardware address of the network device, routing component 224 is configured to add the new next hop entry in the next hop database for a MAC address of the second network device.

After step 414 and/or step 420, routing component 224 programs forwarding information 260 based on forwarding table 241 and next hop database 245 (422). In some examples, to program forwarding information 260, routing component 224 is configured to update forwarding information 260 to specify the new next hop entry or the existing next hop entry as a next hop for the logical address.

Forwarding component 226 forwards packets to the network device using forwarding information 260 (424).

Routing component 224 may execute, based on contents of resolver database 243, one or more address-family-specific control plane functions 397. For example, routing component 224 may determine that an entry in address resolution cache 299 has expired, and update at least resolver database 243 to remove an entry corresponding to the expired entry in address resolution cache 299. Address resolution cache 299 may be maintained in accordance with at least one of an ARP or a NDP. For example, address resolution cache 299 may include ARP cache 247, ND cache 249, or another address resolution cache.

The techniques described in this disclosure may be implemented, at least in part, in hardware, software, firmware or any combination thereof. For example, various aspects of the described techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit comprising hardware may also perform one or more of the techniques of this disclosure.

Such hardware, software, and firmware may be implemented within the same device or within separate devices to support the various operations and functions described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware or software components. Rather, functionality associated with one or more modules or units may be performed by separate hardware or software components, or integrated within common or separate hardware or software components.

The techniques described in this disclosure may also be embodied or encoded in a computer-readable medium, such as a computer-readable storage medium, containing instructions. Instructions embedded or encoded in a computer-readable storage medium may cause a programmable processor, or other processor, to perform the method, e.g., when the instructions are executed. Computer readable storage media may include random access memory (RAM), read only memory (ROM), programmable read only memory (PROM), erasable programmable read only memory (EPROM), electronically erasable programmable read only memory (EEPROM), flash memory, a hard disk, a CD-ROM, a floppy disk, a cassette, magnetic media, optical media, or other computer readable media.

Various examples have been described. These and other examples are within the scope of the following claims.

The invention claimed is:

1. A method comprising:
    receiving, by processing circuitry of a first network device, an indication of a logical address associated with an interface to a second network device;
    adding, by the processing circuitry, an entry to a forwarding table of the first network device, the entry in the forwarding table specifying the logical address;
    adding, by the processing circuitry, an entry to a resolver database of the first network device to which the entry in the forwarding table specifying the logical address points;
    resolving, by the processing circuitry, the logical address to a hardware address of the second network device; and
    in response to determining an existing next hop entry of a next hop database of the first network device corresponds to the hardware address of the second network device, pointing, by the processing circuitry, the entry in the resolver database to the existing next hop entry in the next hop database without adding an additional entry to the next hop database for the second network device.

2. The method of claim 1, further comprising:
    programming, by the processing circuitry, forwarding information of the first network device based on the forwarding table and the next hop database; and
    forwarding packets to the second network device using the forwarding information.

3. The method of claim 2,
    wherein programming the forwarding information comprises updating the forwarding information to specify the existing next hop entry as a next hop for the logical address.

4. The method of claim 1, wherein the logical address is a first logical address, wherein the entry to the resolver database is a first entry to the resolver database, and wherein the entry to the forwarding table is a first entry to the forwarding table, the method further comprising, prior to receiving the indication of the first logical address:
    receiving, by the processing circuitry, an indication of a second logical address associated with the interface to the second network device;
    adding, by the processing circuitry, a second entry to the forwarding table, the second entry in the forwarding table specifying the second logical address;
    adding, by the processing circuitry, a second entry to the resolver database to which the second entry in the forwarding table specifying the second logical address points;
    resolving, by the processing circuitry, the second logical address to the hardware address of the second network device; and
    in response to determining that next hop database does not include an entry corresponding to the hardware address of the second network device, adding, by the processing circuitry, the existing next hop entry in the next hop database for the hardware address of the second network device and, subsequent to adding the existing next hop entry, pointing, by the processing circuitry, the second entry in the resolver database to the existing next hop entry in the next hop database.

5. The method of claim 4, wherein adding the existing next hop entry in the next hop database for the hardware address of the second network device comprises adding the existing next hop entry in the next hop database for a Media Access Control (MAC) address of the second network device.

6. The method of claim 4, wherein the first logical address is in a different address family than the second logical address.

7. The method of claim 4,
    wherein adding the first entry to the forwarding table comprises adding the first entry to the forwarding table specifying a first Internet Protocol (IP) address; and wherein adding the second entry to the forwarding table comprises adding the second entry to the forwarding table specifying a second IP address.

8. The method of claim 7,
wherein resolving the first IP address to the hardware address of the second network device comprises resolving the first IP address using an Address Resolution Protocol (ARP) and wherein resolving the second IP address to the hardware address of the second network device comprises resolving the second IP address using a Neighbor Discovery Protocol (NDP); or
wherein resolving the second IP address to the hardware address of the second network device comprises resolving the second IP address using the ARP and wherein resolving the first IP address to the hardware address of the second network device comprises resolving the first IP address using the NDP.

9. The method of claim 1, wherein the second network device is a subscriber device.

10. The method of claim 1, further comprising:
determining, by the processing circuitry, whether the existing next hop entry of the next hop database corresponds to the hardware address of the second network device.

11. The method of claim 1, further comprising:
executing, based on contents of the resolver database, one or more address-family-specific control plane functions.

12. The method of claim 11, wherein executing the one or more address-family-specific control plane functions comprises determining that an entry in an address resolution cache has expired, and updating at least the resolver database to remove an entry corresponding to the expired entry in the address resolution cache, wherein the address resolution cache is maintained in accordance with at least one of an Address Resolution Protocol (ARP) or a Neighbor Discovery Protocol (NDP).

13. A first network device comprising:
one or more memories for storing a forwarding table, a resolver database, a next hop database; and
processing circuitry connected to the one or more memories and configured to:
receive an indication of a logical address associated with an interface to a second network device;
add an entry to the forwarding table of the first network device, the entry in the forwarding table specifying the logical address;
add an entry to the resolver database of the first network device to which the entry in the forwarding table specifying the logical address points;
resolve the logical address to a hardware address of the second network device; and
in response to determining an existing next hop entry of the next hop database of the first network device corresponds to the hardware address of the second network device, point the entry in the resolver database to the existing next hop entry in the next hop database without adding an additional entry to the next hop database for the second network device.

14. The network device of claim 13, further comprising a forwarding component comprising forwarding information, wherein the processing circuitry is configured to program the forwarding information based on the forwarding table and the next hop database, and
wherein the forwarding component is configured to forward packets to the second network device using the forwarding information.

15. The network device of claim 14, wherein, to program the forwarding information, the processing circuitry is configured to update the forwarding information to specify the existing next hop entry as a next hop for the logical address.

16. The network device of claim 13, wherein the logical address is a first logical address, wherein the entry to the resolver database is a first entry to the resolver database, and wherein the entry to the forwarding table is a first entry to the forwarding table, wherein the processing circuitry is configured to, prior to receiving the indication of the first logical address:
receive an indication of a second logical address associated with the interface to the second network device;
add a second entry to the forwarding table, the second entry in the forwarding table specifying the second logical address;
add a second entry to the resolver database to which the second entry in the forwarding table specifying the second logical address points;
resolve the second logical address to the hardware address of the second network device; and
in response to determining that next hop database does not include an entry corresponding to the hardware address of the second network device, add the existing next hop entry in the next hop database for the hardware address of the second network device and, subsequent to adding the existing next hop entry, point the second entry in the resolver database to the existing next hop entry in the next hop database.

17. The network device of claim 16, wherein, to add the existing next hop entry in the next hop database for the hardware address of the second network device, the processing circuitry is configured to add the existing next hop entry in the next hop database for a Media Access Control (MAC) address of the second network device.

18. The network device of claim 16, wherein the first logical address is in a different address family than the second logical address.

19. The network device of claim 16, wherein adding the first entry to the forwarding table comprises adding the first entry to the forwarding table specifying a first Internet Protocol (IP) address, and
wherein adding the second entry to the forwarding table comprises adding the second entry to the forwarding table specifying a second IP address.

20. A non-transitory computer-readable medium comprising instructions for causing a programmable processor of a first network device to:
receive an indication of a logical address associated with an interface to a second network device;
add an entry to a forwarding table of the first network device, the entry in the forwarding table specifying the logical address;
add an entry to a resolver database of the first network device to which the entry in the forwarding table specifying the logical address points;
resolve the logical address to a hardware address of the second network device; and
in response to determining an existing next hop entry of a next hop database of the first network device corresponds to the hardware address of the second network device, point the entry in the resolver database to the existing next hop entry in the next hop database without adding an additional entry to the next hop database for the second network device.

* * * * *